United States Patent
Dalmatov (10) Patent No.: US 10,496,322 B2
(45) Date of Patent: Dec. 3, 2019

(54) BACKUP SERVER SELECTION BASED ON DATA COMMONALITY

(71) Applicant: EMC CORPORATION, Hopkinton, MA (US)

(72) Inventor: Nickolay Alexandrovich Dalmatov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 405 days.

(21) Appl. No.: 15/321,500

(22) PCT Filed: Mar. 29, 2016

(86) PCT No.: PCT/RU2016/000176
§ 371 (c)(1),
(2) Date: Dec. 22, 2016

(87) PCT Pub. No.: WO2017/171574
PCT Pub. Date: Oct. 5, 2017

(65) Prior Publication Data
US 2019/0171362 A1 Jun. 6, 2019

(51) Int. Cl.
G06F 3/06 (2006.01)
G06F 7/02 (2006.01)
G06F 16/00 (2019.01)
G06F 11/14 (2006.01)
H04L 9/06 (2006.01)

(52) U.S. Cl.
CPC ............ *G06F 3/065* (2013.01); *G06F 3/067* (2013.01); *G06F 3/0619* (2013.01); *G06F 7/02* (2013.01); *G06F 11/1453* (2013.01); *G06F 16/00* (2019.01); *H04L 9/0643* (2013.01); *G06F 11/1464* (2013.01)

(58) Field of Classification Search
CPC ................................ G06F 3/065; G06F 3/067
USPC ........................................................ 713/164
See application file for complete search history.

(56) References Cited

U.S. PATENT DOCUMENTS

| | | | |
|---|---|---|---|
| 8,443,153 B1 * | 5/2013 | Edwards | G06F 11/1076 711/147 |
| 8,555,022 B1 * | 10/2013 | Edwards | G06F 3/0607 711/170 |
| 9,740,574 B2 * | 8/2017 | Kochunni | G06F 11/1448 |
| 10,152,231 B2 * | 12/2018 | Kripalani | G06F 3/065 |
| 2003/0056139 A1 | 3/2003 | Murray et al. | |
| 2011/0066754 A1 | 3/2011 | Stryker et al. | |

(Continued)

*Primary Examiner* — Khalil Naghdali
(74) *Attorney, Agent, or Firm* — BainwoodHuang (57) ABSTRACT

Techniques of backing up data stored on host computing devices involve selecting a backup server from among multiple servers on which to back up host data based on a measure of commonality between the host data and data stored in the backup servers. Prior to sending data for backup, a host sends a set of host data representations to a backup system. Each host data representation is based on a respective hash value computed from a respective block of the host data. The backup system compares the set of host data representations with server data representations for each backup server and computes a commonality score for each backup server. The backup system then selects a backup server on which to place the host data based at least in part on the commonality scores. Host data are then directed to the selected backup server for backup.

20 Claims, 4 Drawing Sheets

(56) References Cited

U.S. PATENT DOCUMENTS

| | | | | |
|---|---|---|---|---|
| 2014/0040580 A1* | 2/2014 | Kripalani | ............... | G06F 3/065 |
| | | | | 711/162 |
| 2014/0181032 A1* | 6/2014 | Kumarasamy | ...... | G06F 11/1464 |
| | | | | 707/640 |
| 2016/0112407 A1* | 4/2016 | Nara | ................... | H04L 67/1095 |
| | | | | 726/5 |
| 2017/0177867 A1* | 6/2017 | Crofton | ................ | G06F 16/113 |

* cited by examiner

BACKUP SERVER SELECTION BASED ON DATA COMMONALITY

CROSS-REFERENCE TO RELATED APPLICATIONS:

This application is a national phase entry of PCT/RU/2016000176, filed Mar. 29, 2016.

BACKGROUND

Backup systems provide backup storage to remote host computers. A conventional backup system includes multiple backup servers, each of which contains storage disks on which host data is backed up. Some backup systems also include a broker computer that selects backup servers on which to store arriving data. For example, a broker computer may perform load balancing operations, such as for balancing the amount of data stored on each backup server, managing network traffic, and avoiding hot spots. In such a backup system, when a host computer sends backup data to the backup system, the broker computer steers the backup data to a backup server that has available storage space and bandwidth.

Some backup servers perform deduplication on backup data. Such deduplication involves a backup server searching backed up data on its storage devices for redundant data blocks. Upon finding a redundant block, deduplication replaces the redundant block with a pointer to a remaining block that contains the common data. As is known, a "block" is a logical unit of storage, such as 4 KB, 8 KB, or some other size, which is generally the smallest unit of storage that a file system can allocate and manage.

SUMMARY

By supporting deduplication, the backup servers in the above-described conventional backup system provide a measure of storage efficiency. Unfortunately, however, backup efficiency is still less than optimal. For example, a conventional backup system that places host data on backup servers based on load balancing does not consider the content of the data being backed up. Consequently, opportunities for achieving higher storage efficiency are lost.

In contrast with the above-described conventional backup system, which does not take data content into account when directing host data to a backup server, improved techniques of backing up data stored on a host computing device involves selecting a backup server on which to place the host data from among multiple backup servers based on a measure of commonality between the host data and data already stored on the backup servers. Prior to sending data for backup, the host computing device sends a set of host data representations to a backup system. Each data representation is based on a respective hash value computed from a respective block of the host data and is reasonably specific, if not unique, to the data in the respective block. The backup system compares the set of host data representations with server data representations, computed in a similar manner, from of each multiple backup servers and computes a commonality score for each backup server. The commonality score for each backup server indicates a measure of commonality between the set of host data representations and the server data representations of that backup server. The backup system then selects a backup server on which to place the host data based at least in part on the commonality scores. Host data are then directed to the selected backup server for backup.

Advantageously, the improved techniques enhance storage efficiency by placing host data on backup servers that store similar data and thus enable higher levels of deduplication. Overall storage efficiency of the backup system is therefore improved.

One embodiment is directed to a method of backing up data stored on host computing devices. The method includes receiving, by processing circuitry of a backup system, (i) a request to back up host data stored on a host computing device and (ii) a set of multiple host data representations, each host data representation based on a respective hash value computed from a respective block of the host data of the host computing device. The method also includes computing multiple commonality scores, including one commonality score for each of multiple backup servers in the backup system, each commonality score for a respective backup server indicating a measure of commonality between the set of host data representations and a respective set of server data representations for that backup server, each backup server including a respective set of storage devices. The method further includes backing up the host data by (i) selecting one of the backup servers on which to back up the host data based at least in part on the commonality scores, and (ii) storing the host data in the set of storage devices of the selected backup server.

Additionally, some embodiments are directed to a computer program product having a non-transitory computer readable storage medium that stores instructions which, when executed by a computer, cause the computer to carry out the method of backing up data stored on host computing devices.

Further, some embodiments are directed to an apparatus including memory and controlling circuitry constructed and arranged to carry out a method of backing up data stored on host computing devices.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of backing up data stored on host computing devices involve selecting backup servers on which to place host data from among multiple servers based on a measure of commonality between the host data and data already stored on the backup servers. Advantageously, the improved techniques enhance storage efficiency by placing host data on backup servers that enable improved deduplication efficiency.

Figure 1:
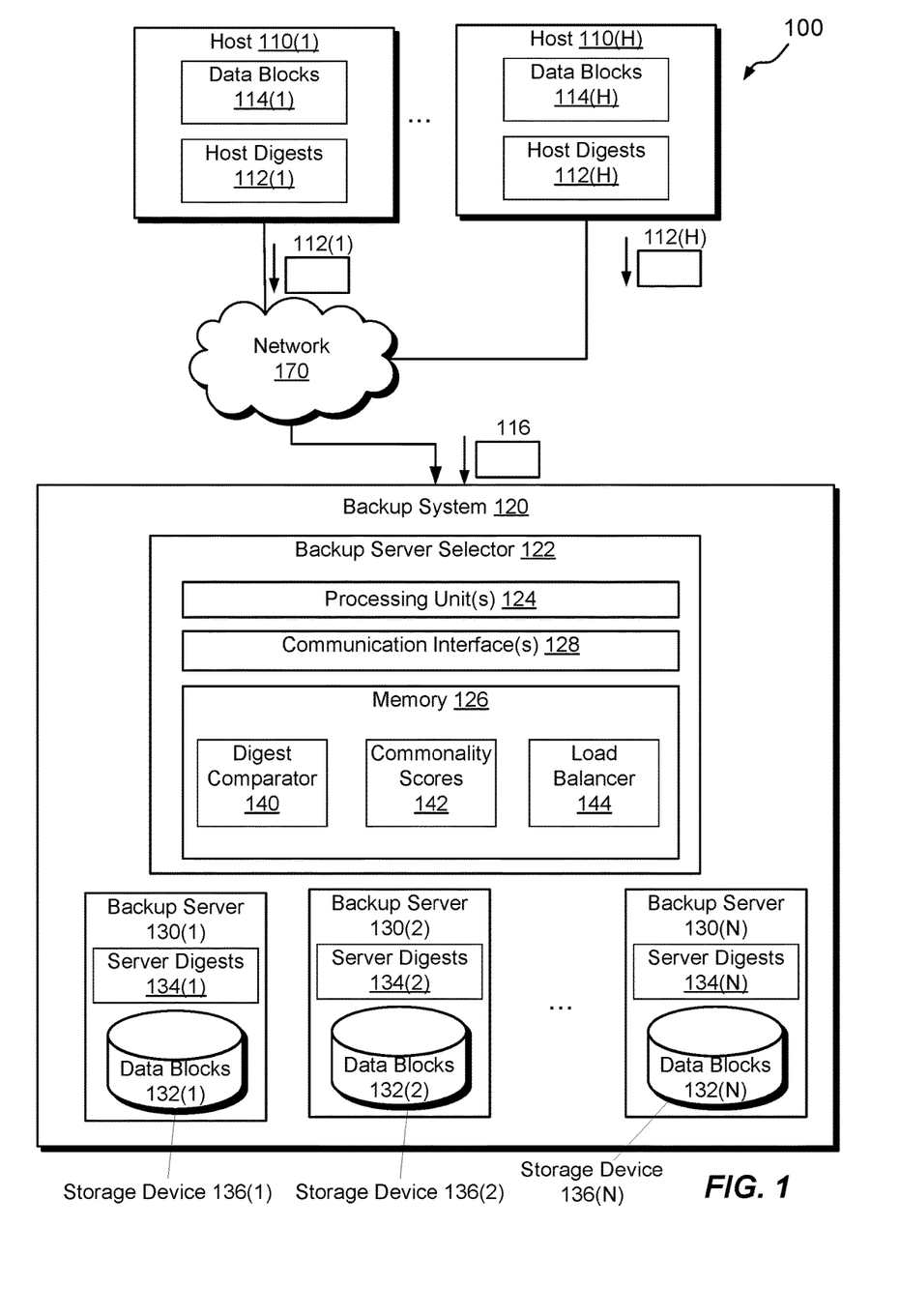
FIG. 1 is a block diagram illustrating an example electronic environment in which the improved technique can be carried out.

FIG. 1 shows an example electronic environment 100 in which embodiments of the improved techniques hereof can be practiced. Here, electronic environment 100 includes host computing devices ("hosts") 110(1), . . . , 110(H), backup system 120, and electronic network 170.

Each host, e.g., host 110(1), is configured to generate and store host data. The host 110(1) stores the host data in data blocks 114(1), where each data block 114(1) is an addressable amount of host data, such as 4 KB, 8 KB, or some other size. Prior to backing up the host data in the backup system 120, the host 110(1) is configured to generate a set of digests 112(1) by applying a cryptographic hash function to the data in each of data blocks 114(1). Non-limiting examples of a cryptographic hash function includes SHA-1, SHA-2, and MD5. The host 110(1) may be any computing device that generates data by running applications, including a desktop computer, a laptop computer, a smartphone, a tablet computer, a PDA, a server computer, and the like.

The electronic network 170 provides network connections between the backup system 120 and the hosts 110(1), . . . , 110(H). The electronic network 170 may implement any of a variety of protocols and topologies that are in common use for communications over the Internet or other networks. Further, the electronic network 170 may include various components (e.g., cables, switches/routers, gateways/bridges, etc.) that are used in such communications.

The backup system 120 is configured to provide data backup services to the hosts 110(1), . . . , 110(H). As illustrated in FIG. 1, the backup system 120 is implemented as a computer system that is in communication with the hosts 110(1), . . . , 110(H) over the electronic network 170. In some arrangements, the backup system 120 is part of a data storage system and processes I/O requests from the hosts 110(1), . . . , 110(H).

The backup system 120 is seen to include a backup server selector 122 and a set of backup servers 130(1), 130(2), . . . , 130(N). The backup server selector 122 includes one or more communication interfaces 128, a set of processing units 124, memory 126. The communication interfaces 128 include, for example, Ethernet adapters, Token Ring adapters, and the like, for converting electronic and/or optical signals received from the electronic network 170 to electronic form for use by the backup system 120. The set of processing units 124 include one or more processing chips and/or assemblies. The memory 126 includes both volatile memory (e.g., RAM), and non-volatile memory, such as one or more ROMs, disk drives, solid state drives, and the like. The set of processing units 124 and the memory 126 together form control circuitry, which is constructed and arranged to carry out various methods and functions as described herein.

The memory 126 includes a variety of software constructs realized in the form of executable instructions, such as digest comparator 140 and load balancer 144. When the executable instructions are run by the set of processing units 124, the set of processing units 124 are caused to carry out the operations of the software constructs. Although certain software constructs are specifically shown and described, it is understood that the memory 126 typically includes many other software constructs, which are not shown, such as an operating system, various applications, processes, and daemons, for example. The memory 126 is also constructed and arranged to store various data. For example, memory 126 stores commonality scores 142.

The digest comparator 140 is a software construct configured to compare the set of host digests, e.g., 112(1) of the host 110(1) with sets of server digests, e.g., 134(1 . . . N) of backup server 130(1 . . . N). In a typical arrangement, the digest comparator 140 compares the values of host digests 112(1) with the values of each of server digests 134(1 . . . N).

The load balancer 144 is a software construct configured to periodically measure the percentage of storage space used in each storage device 132(1), . . . , 132(N). Based on the percentage measured and the known capacity of a storage device, e.g., 132(1), the backup system 120 can determine how much free space is available to store host data for backup.

In an example, each of the backup servers 130(1), . . . , 130(N), e.g., 130(1), is a data storage system configured to store backup data from hosts, e.g., host 110(1), so that the host data is available to be restored back to the host 110(1) if needed. Each of the backup servers, e.g., 130(1), includes a respective storage device 136(1) that stores blocks of server data 132(1). It should be understood, however, that the each backup server may include multiple storage devices. Further, because each backup server, e.g., 130(1), performs deduplication on the data blocks, e.g., 132(1), each backup server, e.g., 134(1), generates and stores a respective set of digests, e.g., 134(1), of respective server data blocks, e.g., 132(1). The backup server generates the digests using the same cryptographic hash function that the host uses to generate the host digests.

During example operation, a host, e.g., host 110(1) sends a set of host digests 112(1) to the backup system 120, e.g., along with a request 116 to back up its data to the backup system 120 over the network 170. The set of host digests 112(1) may include digests of all data blocks stored on host 110(1) or, more typically, digests some subset of all data blocks on the host 110(1). Upon receiving the request 116 and the host digests 112(1), the backup server compares the host digests 112(1) to each set of server digests 134(1), . . . , 134(N) to produce a commonality score 142 for each of the backup servers 130(1), . . . , 130(N). Based on the commonality scores 142 and, in some cases, results of load balancing from the load balancer 144, the backup system selects a backup server, e.g., 130(2), and directs host data to be backed up to the selected backup server 130(2).

Figure 2:
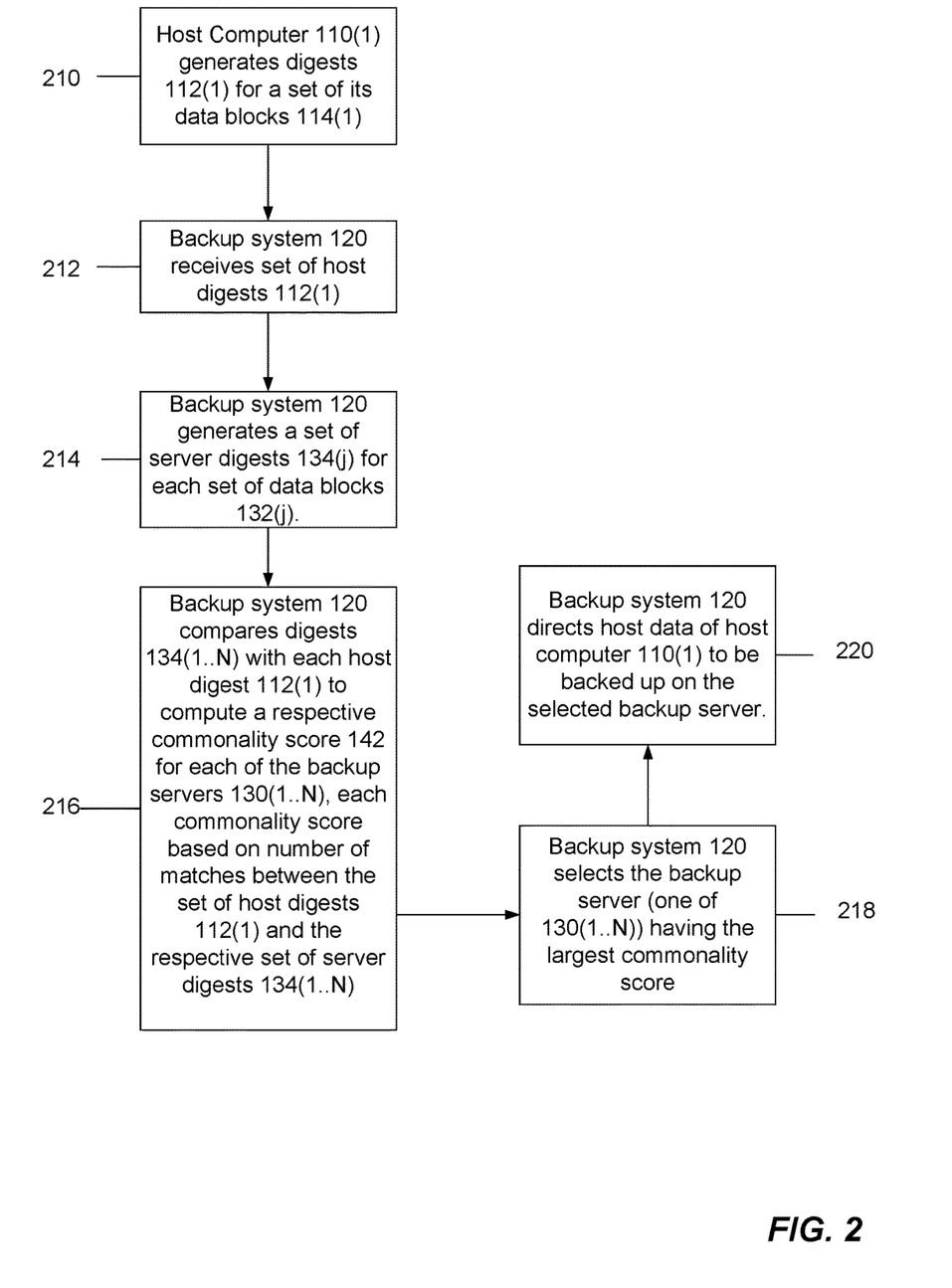
FIG. 2 is a flow chart illustrating an example process of selecting a backup server based on counts of matching digests within the electronic environment shown in FIG. 1.

FIG. 2 shows an example process 200 for backing up data from a host computer 110(1). Process 200 specifically concerns direct comparisons of data representations generated by the host 110(1) and by each of the backup servers 130(1), . . . , 130(N). A result of process 200 is a determination of which of the backup servers 130(1), . . . , 130(N) to select for backing up data from the host 110(1).

At 210, the host 110(1) generates digests 112(1) for a set of its data blocks 114(1). In an example, the host 110(1) generates a digest as a bit string output from a cryptographic hash function applied to a block of data 114(1). The output bit string may be of any length. However, typical bit string sizes are 256 bits for SHA-3 (e.g., SHA-256), although they can be smaller (e.g., 224 bits) or larger (e.g., 512 bits).

Even though digests are typically much smaller than the data blocks they represent, even the transmission of digests for each block of data 114(1) may be burdensome. For example, it may be costly in terms of network bandwidth to transmit a different digest 112(1) for each block 114(1) of host data to the backup system 120 over the network 170. Also, it may be burdensome for the backup system 120 to perform a comparisons based on so many host digests 112(1). Accordingly, in some arrangements, only certain bits of the host digests 112(1) are transmitted to the backup server 120. For example, in one arrangement, the host 110(1) only transmits the first 16 bits of each digest 112(1). In another arrangement, the host 110(1) transmits every $16^{th}$ bit of each digest 112(1). In this way, the digest data transmitted to the backup server is significantly reduced. Also, the work involved in performing comparisons at each backup server 130(1), ..., 130(N) is greatly reduced, as the backup servers need only attempt to match the bits actually received. Although sending a reduced number of bits of each digest to the backup system 120 reduces the ability of digests to uniquely identify data blocks, the reduction in accuracy may be offset by improvements in efficiency. For example, it is not always necessary that comparisons are perfectly accurate as long as they provide an improvement over performing no comparisons at all.

In still other arrangements, the host 110(1) may send digests in which specific bits have been set to specific values. For example, all digests in which the $2^{nd}$, the $15^{th}$, and the $31^{st}$ bits are set to one may be sent by the host 110(1).

In another arrangement, the host 110(1) selects a subset of all the data blocks it contains from which to generate the digests 112(1). For example, the host 110(1) may apply a cryptographic hash function to every $64^{th}$ data block. In other examples, the host 110(1) may apply the cryptographic hash function to every $32^{nd}$, $128^{th}$, etc., data block, or by selecting blocks in a random pattern. Although accuracy of comparisons is diminished, it has been discovered that the reduction in accuracy is less than expected. Selecting data blocks randomly has been found to reduce comparison accuracy by less than selection blocks at regular intervals. Experiments show that it is sufficiently effective to select every $8^{th}$ or $16^{th}$ digest.

At 212, the backup system 120 receives the host digests 112(1) via the communication interface 128. Again, when the above-described data reduction techniques are used at the host 110(1), there is significantly less data received at the backup system 120 and the selection of a backup server to back up the host data can proceed efficiently.

At 214, the backup system 120 generates a set of server digests 134(1), ..., 134(N) for each set of data blocks 132(1), ..., 132(N). It should be understood that, if the host 110(1) sampled bits of digests before sending them, then the same sampling should be applied when computing (or comparing) server digests by the backup servers.

In some arrangements, the backup system 120 may perform a sampling of server blocks, e.g., such that sets of server blocks 132(1 ... N) include only 1 out of every 64 server blocks, for example. Such sampling of server blocks may be performed regardless of whether the host samples server blocks. Although sampling of blocks, by the host and/or by the servers, reduces sample size and this may reduce comparison accuracy, such reduction in comparison accuracy applies equally to comparisons made for all servers and may have little impact on relative results. For example, although each comparison of host digests to server digests may result in fewer matches when sampling is performed, the reduction in numbers of matches occurs more or less equally across all comparisons, such that relative results are largely unaffected.

At 216, the backup system 120 compares server digests 134(1), ..., 134(N) with the host digests 112(1) to compute respective commonality scores 142. In an example, the commonality score for each backup server 130(1), ..., 130(N) is equal to the number of matches between the host digests 112(1) and that backup server's digests.

At 218, the backup system 120 selects a backup server, e.g., backup server 130(k), that has the largest commonality score 142. The backup system 120 then directs the host data to be backed up on the selected backup server 130(k). However, in other arrangements, the backup server bases the selection of a backup server on both the commonality scores 142 and on the output of a load balancing operation carried out by the load balancer 144. For example, suppose that the backup server 130(2) has the largest commonality score 142 but the load balancer 144 has found that the storage device 136(2) of the backup server 130(2) is 99.9% full. In this case, the backup server 130(2) may not be able to handle the incoming host data for backup. In this example, the backup system 120 may identify the backup server having the next highest commonality score 142, e.g., 130(1). If the load balancer 144 finds that the storage device 130(1) has enough available space, then the backup system may select that backup server 130(1) for backing up the host data.

At 220, the backup system 120, upon receiving data from the host 110(1) to be backed up, directs this data to the selected backup server. Once the new host data are stored, the selected backup server may regenerate its digests to include digests for the newly arriving data. Alternatively, the selected backup server may regenerate its digests on a schedule, such as every day, week, etc.

It should be understood that there are alternatives to the above comparisons of the host digests 112(1) with server digests 134(1), ..., 134(N) for selecting backup servers. An example of such an alternative is shown in FIG. 3.

Figure 3:
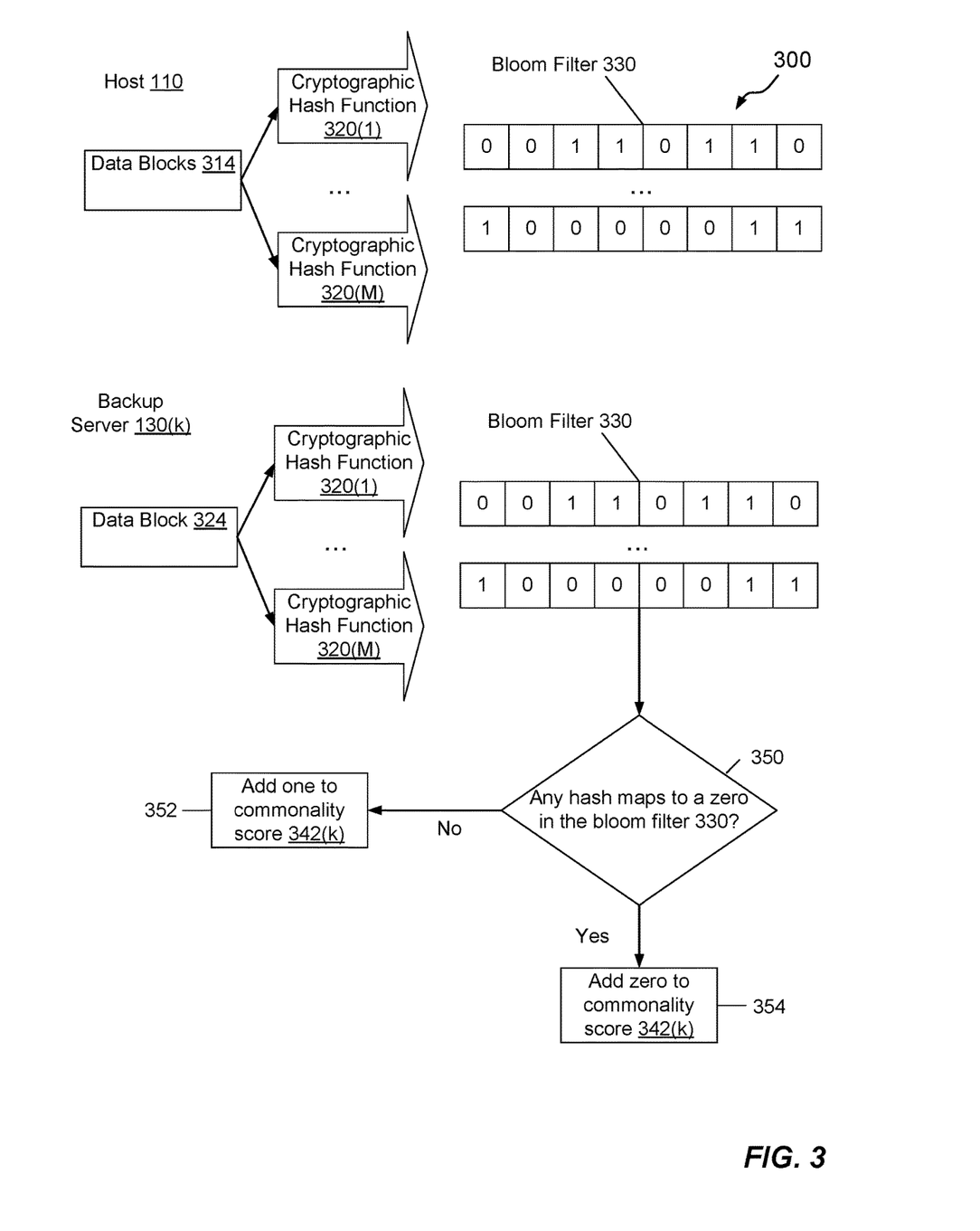
FIG. 3 is a block diagram illustrating an example arrangement for selecting backup servers using a bloom filter within the electronic environment shown in FIG. 1.

FIG. 3 illustrates a block diagram of an alternative process 300 of selecting a backup server based on a commonality score 342. In this case, each of the host 110 and the backup system 120 store the same, multiple cryptographic hash functions 320(1), ..., 320(M). When applied to a block of data 314, rather than generating digests for that block of data 314, the host 110 generates 1's in various positions in a Bloom filter 330.

The Bloom filter 330 includes a string of bits that are initially all 0's. Each application of a cryptographic hash function, say, 320(1) on a data block 314 results in a single bit at a bit position in the Bloom filter 330 being changed to take the value of 1. After applying each of the cryptographic hash functions 320(1), ..., 320(M) to each of the data blocks 314 under consideration (e.g., every $64^{th}$ data block), the host 110 has created, as the Bloom filter 330, a bit string with 1's and 0's in various positions of the bit string.

After creating the Bloom filter 330, the host 110 sends the Bloom filter 330 to the backup system 120. The backup system 120 then applies the same cryptographic hash functions 320(1) ..., 320(M) to the data blocks 324 on each of the backup servers, say, backup server 130(k), where 1<=k<=N. If application of a cryptographic hash function, say, cryptographic hash function 320(1) to a data block 324 results in a pointer to a position in the Bloom filter 330 at which there is a 0, then it may be said with certainty that the data block 324 is not among those data blocks 314 sampled at the host 110. In that case, there is no match between the data block 324 at the backup server 130(k) and the blocks 314 of the host 110 and therefore no contribution to the commonality score 342(k). However, if all of the cryptographic hash functions 320(1) ..., 320(M) applied to a backup server block 324 result in positions in the bloom filter 330 having all ones and no 0's, then it may with reasonable certainty be considered that backup server block 324 as matching a host data block 314. In this case, we may increment the commonality score 342(k). All subsequent steps in selecting the backup server 130(1), ..., 130(M) given the commonality score 342 are the same as those illustrated in FIG. 2.

Figure 4:
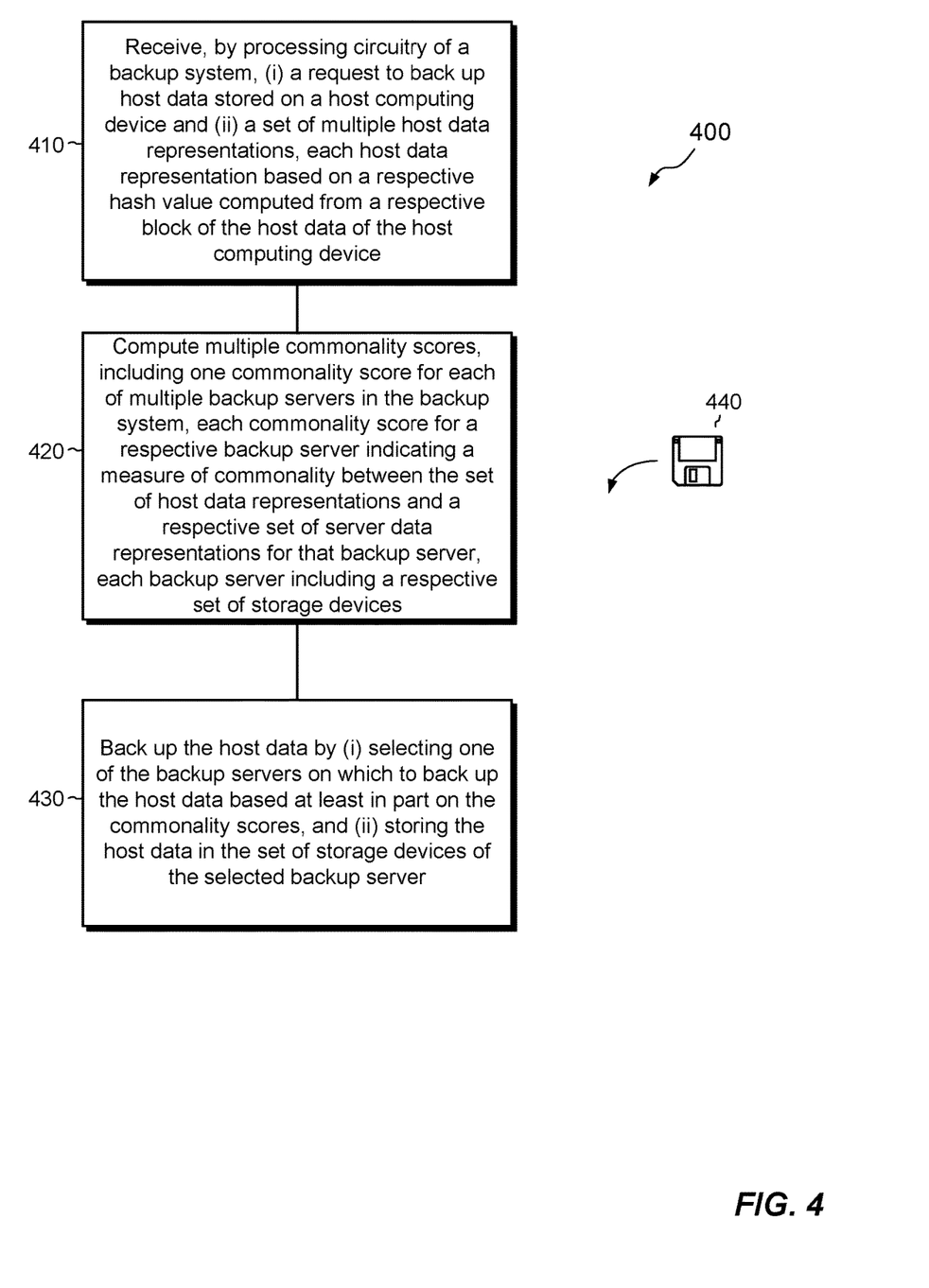
FIG. 4 is a flow chart illustrating an example method of backing up data stored on host computing devices, which may be performed in the electronic environment shown in FIG. 1.

FIG. 4 illustrates a method 400 of backing up data stored on host computing devices. The method 400 may be performed by the software constructs described in connection with FIG. 1, which reside in the memory 126 of the backup system 120 and are run by the set of processing units 124.

At 410, a backup system receives (i) a request to back up host data stored on a host computing device and (ii) a set of multiple host data representations. Each host data representation is based on a respective hash value computed from a respective block of the host data of the host computing device.

At 420, the backup system computes multiple commonality scores, including one commonality score for each of multiple backup servers in the backup system. Each commonality score for a respective backup server indicates a measure of commonality between the set of host data representations and a respective set of server data representations for that backup server. Each backup server includes a respective set of storage devices.

At 430, the backup system backs up the host data by (i) selecting one of the backup servers on which to back up the host data based at least in part on the commonality scores, and (ii) storing the host data in the set of storage devices of the selected backup server.

Improved techniques have been described for backing up data stored on host computing devices and involve selecting a backup server from among multiple servers based on a measure of commonality between the host data and data already stored on the servers. The measure of commonality is established based on data representations, which are compact and convenient to handle by the backup system in which the backup servers are contained. Such data representations may include digests, bit-sampled digests, subsets of digests, and/or Bloom filters.

Having described certain embodiments, numerous alternate embodiments or variations can be made. For example, in one alternative embodiment, the hosts may perform pairwise comparisons of their own data blocks and identify amongst themselves the best backup servers to use. For instance, a first host may determine that the best backup server to use in backing up its own data is the same one that is used to back up data of a second host, e.g., if the data representations of the second host match the data representations of the first host more closely than do the data representations of any other host.

One should appreciate that the above-described techniques are not directed to a mere abstract idea. Rather, the disclosed technique is directed to improving a technological process, namely that of backing up host data in a backup system that contains backup servers having data stored in storage devices.

In some arrangements, the backup system 120 is implemented by a set of cores or other types of control/processing circuitry running software. In such arrangements, the software instructions can be delivered, within the backup system 120, in the form of a computer program product 440. Alternative examples of suitable computer readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is intended to be set forth in this document.

What is claimed is:

1. A method of backing up data stored on host computing devices, the method comprising:
   receiving, by processing circuitry of a backup system, (i) a request to back up host data stored on a host computing device and (ii) a set of multiple host data representations, each host data representation based on a respective hash value computed from a respective block of the host data of the host computing device;
   computing multiple commonality scores, including one commonality score for each of multiple backup servers in the backup system, each commonality score for a respective backup server indicating a measure of commonality between the set of host data representations and a respective set of server data representations for the respective backup server, each backup server including a respective set of storage devices; and
   backing up the host data by (i) selecting one of the backup servers on which to back up the host data based at least in part on the commonality scores, and (ii) storing the host data in the set of storage devices of the selected backup server,
   wherein backing up the host data further includes performing a load balancing assessment, the load balancing assessment producing a load balancing result indicating relative loading of the backup servers, and wherein selecting one of the backup servers on which to back up the host data is also based in part on the load balancing result.

2. A method as in claim 1, wherein selecting the backup server on which to back up the host data includes (i) comparing the commonality scores to identify a backup server having the highest commonality score and (ii) identifying the selected backup server as the backup server having the highest commonality score.

3. A method as in claim 2, wherein receiving the set of multiple host data representations includes receiving, as each data representation, the respective hash value,
   wherein each hash value was computed by applying a cryptographic hash function to the respective block of host data,
   wherein each of the backup servers stores a respective set of data blocks, and
   wherein the method further comprises, for each backup server, generating the set of server data representations for the respective backup server by applying the cryptographic hash function to each of the set of data blocks of the respective backup server to produce, as the set of server data representations for the respective backup server, a set of hash values for the respective backup server.

4. A method as in claim 3, wherein computing the multiple commonality scores includes, for each of the backup servers, counting a number of matches between the hash values received from the host and the set of hash values for the respective backup server to produce a total for the respective backup server, wherein the selected backup server is the backup server for which the largest total is produced.

5. A method as in claim 4, wherein each hash value is M bits in length, and wherein applying the cryptographic function to each of the set of data blocks of each backup server includes (i) applying a hash function to generate a N-bit result and (ii) sampling the N-bit result to produce an M-bit result, wherein M is less than N.

6. A method as in claim 2, wherein the set of host data representations includes a bloom filter of blocks of the host data, the bloom filter including (i) a set of cryptographic hash functions and (ii) a bit string of a predetermined length, each of the set of cryptographic hash functions mapping a block of host data to a respective position in the bit string, the bit string having a set of mapped positions and a set of unmapped positions, each mapped position in the bit string having a first value, each unmapped position in the bit string having a second value;

wherein each of the backup servers stores respective blocks of data;

wherein the method further comprises, for each of the backup servers, applying each of the set of cryptographic hash functions to a block of data of the respective backup server to produce a bit position of that hash function for that block of data;

wherein computing the multiple commonality scores includes, for each of the backup servers, (i) applying each of the cryptographic hash functions to a block of data of the respective backup server to produce a set of bit positions and (ii) reducing the commonality score for the respective backup server in response to at least one of the produced set of bit positions of the bit string of the bloom filter having the second value.

7. A method as in claim 1, wherein the host data representations received by the backup system pertain to a subset of all of the data blocks stored in the host computing device.

8. A method as in claim 7, wherein each set of server data representations for a backup server pertains to a subset of all of the data blocks stored on the respective backup server.

9. A method as in claim 1, wherein each set of server data representations for a particular backup server pertains to a subset of all of the data blocks stored on the particular backup server.

10. A computer program product including a set of non-transitory, computer-readable storage media storing executable instructions, which when executed by a computer, causes the computer to perform a method of backing up data stored on host computing devices, the method comprising:

receiving (i) a request to back up host data stored on a host computing device and (ii) a set of multiple host data representations, each host data representation based on a respective hash value computed from a respective block of the host data of the host computing device;

computing multiple commonality scores, including one commonality score for each of multiple backup servers in the backup system, each commonality score for a respective backup server indicating a measure of commonality between the set of host data representations and a respective set of server data representations for the respective backup server, each backup server including a respective set of storage devices; and backing up the host data by (i) selecting one of the backup servers on which to back up the host data based at least in part on the commonality scores, and (ii) storing the host data in the set of storage devices of the selected backup server, wherein selecting the backup server on which to back up the host data includes (i) comparing the commonality scores to identify a backup server having the highest commonality score and (ii) identifying the selected backup server as the backup server having the highest commonality score, wherein receiving the set of multiple host data representations includes receiving, as each data representation, the respective hash value, wherein each hash value was computed by applying a cryptographic hash function to the respective block of host data, wherein each of the backup servers stores a respective set of data blocks, wherein the method further comprises, for each backup server, generating the set of server data representations for the respective backup server by applying the cryptographic hash function to each of the set of data blocks of the respective backup server to produce, as the set of server data representations for the respective backup server, a set of hash values for the respective backup server, wherein computing the multiple commonality scores includes, for each of the backup servers, counting a number of matches between the hash values received from the host and the set of hash values for the respective backup server to produce a total for the respective backup server, and wherein the selected backup server is the backup server for which the largest total is produced.

11. A computer program product as in claim 10, each hash value is M bits in length, and wherein applying the cryptographic function to each of the set of data blocks of each backup server includes (i) applying a hash function to generate a N-bit result and (ii) sampling the N-bit result to produce an M-bit result, wherein M is less than N.

12. A computer program product as in claim 10, wherein the set of host data representations includes a bloom filter of blocks of the host data, the bloom filter including (i) a set of cryptographic hash functions and (ii) a bit string of a predetermined length, each of the set of cryptographic hash functions mapping a block of host data to a respective position in the bit string, the bit string having a set of mapped positions and a set of unmapped positions, each mapped position in the bit string having a first value, each unmapped position in the bit string having a second value;

wherein each of the backup servers stores respective blocks of data;

wherein the method further comprises, for each of the backup servers, applying each of the set of cryptographic hash functions to a block of data of the respective backup server to produce a bit position of that hash function for that block of data;

wherein computing the multiple commonality scores includes, for each of the backup servers, (i) applying each of the cryptographic hash functions to a block of data of the respective backup server to produce a set of bit positions and (ii) reducing the commonality score for the respective backup server in response to at least one of the produced set of bit positions of the bit string of the bloom filter having the second value.

13. A computer program product as in claim 10, wherein each set of server data representations for a backup server pertains to a subset of all of the data blocks stored on the respective backup server.

14. A computer program product as in claim 13, wherein each set of server data representations for a backup server pertains to a subset of all of the data blocks stored on the respective backup server.

15. A computer program product as in claim 10, wherein each set of server data representations for a particular backup server pertains to a subset of all of the data blocks stored on the particular backup server.

16. An electronic apparatus comprising memory and controlling circuitry coupled to the memory, the controlling circuitry being constructed and arranged to:
  receive (i) a request to back up host data stored on a host computing device and (ii) a set of multiple host data representations, each host data representation based on a respective hash value computed from a respective block of the host data of the host computing device;
  compute multiple commonality scores, including one commonality score for each of multiple backup servers in the backup system, each commonality score for a respective backup server indicating a measure of commonality between the set of host data representations and a respective set of server data representations for the respective backup server, each backup server including a respective set of storage devices; and
  back up the host data by (i) selecting one of the backup servers on which to back up the host data based at least in part on the commonality scores, and (ii) storing the host data in the set of storage devices of the selected backup server,
  wherein the controlling circuitry constructed and arranged to back up the host data further is further constructed and arranged to perform a load balancing assessment, the load balancing assessment producing a load balancing result indicating relative loading of the backup servers, and wherein selecting one of the backup servers on which to back up the host data is also based in part on the load balancing result.

17. An electronic apparatus as in claim 16, wherein selecting the backup server on which to back up the host data includes (i) comparing the commonality scores to identify a backup server having the highest commonality score and (ii) identifying the selected backup server as the backup server having the highest commonality score.

18. An electronic apparatus as in claim 17, wherein each of the set of host data representations is a respective hash value,
  wherein each hash value is computed by applying a cryptographic hash function to the respective block of host data,
  wherein each of the backup servers stores a respective set of data blocks, and
  wherein the controlling circuitry is further constructed and arranged to generate, for each backup server, the set of server data representations for the respective backup server by applying the cryptographic hash function to each of the set of data blocks of the respective backup server to produce, as the set of server data representations for the respective backup server, a set of hash values for the respective backup server.

19. An electronic apparatus as in claim 18, wherein the controlling circuitry constructed and arranged to compute the multiple commonality scores is further constructed and arranged to count, for each of the backup servers, a number of matches between the hash values received from the host and the set of hash values for the respective backup server to produce a total for the respective backup server, wherein the selected backup server is the backup server for which the largest total is produced.

20. An electronic apparatus as in claim 17, wherein the set of host data representations includes a bloom filter of blocks of the host data, the bloom filter including (i) a set of cryptographic hash functions and (ii) a bit string of a predetermined length, each of the set of cryptographic hash functions mapping a block of host data to a respective position in the bit string, the bit string having a set of mapped positions and a set of unmapped positions, each mapped position in the bit string having a first value, each unmapped position in the bit string having a second value;
  wherein each of the backup servers stores respective blocks of data;
  wherein the controlling circuitry is further constructed and arranged to, for each of the backup servers, apply each of the set of cryptographic hash functions to a block of data of the respective backup server to produce a bit position of that hash function for that block of data;
  wherein the controlling circuitry constructed and arranged to compute the multiple commonality scores is further constructed and arranged to, for each of the backup servers, (i) apply each of the cryptographic hash functions to a block of data of the respective backup server to produce a set of bit positions and (ii) reduce the commonality score for the respective backup server in response to at least one of the produced set of bit positions of the bit string of the bloom filter having the second value.

\* \* \* \* \*